United States Patent
Carr et al.

(10) Patent No.: US 9,900,439 B2
(45) Date of Patent: Feb. 20, 2018

(54) METHOD AND SYSTEM FOR CALL-FORWARD INITIATED BY MOVEMENT

(71) Applicant: Swisscom AG, Bern (CH)

(72) Inventors: Tim Carr, Effretikon (CH); Frank Fitzlaff, Langnau (CH)

(73) Assignee: Swisscom AG, Bern (CH)

( * ) Notice: Subject to any disclaimer, the term of this patent is extended or adjusted under 35 U.S.C. 154(b) by 0 days.

(21) Appl. No.: 14/272,134

(22) Filed: May 7, 2014

(65) Prior Publication Data
US 2014/0335840 A1 Nov. 13, 2014

(30) Foreign Application Priority Data
May 8, 2013 (EP) .................... 13166961

(51) Int. Cl.
*H04M 3/54* (2006.01)
*H04W 4/16* (2009.01)
*H04M 3/58* (2006.01)
*H04M 3/42* (2006.01)

(52) U.S. Cl.
CPC ............ *H04M 3/543* (2013.01); *H04M 3/58* (2013.01); *H04W 4/16* (2013.01); *H04M 3/42263* (2013.01)

(58) Field of Classification Search
CPC ........ H04M 3/54; H04M 1/006; H04M 3/543; H04W 4/16; H04W 52/0254
USPC ........................ 455/417, 445, 556.1, 212.01; 379/211.02, 212.01
See application file for complete search history.

(56) References Cited

U.S. PATENT DOCUMENTS

| 8,306,516 B2 | 11/2012 | Levien et al. |
| 2006/0091205 A1 | 5/2006 | Agrawal |
| 2007/0066323 A1* | 3/2007 | Park .................... G01S 5/02 455/456.2 |

(Continued)

FOREIGN PATENT DOCUMENTS

WO 2007/118250 A2 10/2007

OTHER PUBLICATIONS

European Patent Office, Communication with extended European search report, in Application No. 13166961.6, dated Aug. 29, 2013 (7 pages).

*Primary Examiner* — Kimberly A Williams
(74) *Attorney, Agent, or Firm* — McAndrews, Held & Mallory (57) ABSTRACT

Methods and systems for call-forward initiated by movement may comprise receiving a call in a first communication device, sensing a motion of the first communication device, and causing the forwarding of the received call to a second communication device based on the sensed motion of the first communication device. The second communication device may be selected from one or more detected communication devices based on the sensed motion. The second communication device may be selected based on a direction of the sensed motion of the first communication device. The call may be established over a first communication network between a server and the first communication device, and the call may be forwarded to the second communication device by switching the call in the server to the second communication device over a second communication network. The call may be forwarded to the second communication device over the local connection.

20 Claims, 8 Drawing Sheets

(56) References Cited

U.S. PATENT DOCUMENTS

| | | | | |
|---|---|---|---|---|
| 2007/0287438 | A1* | 12/2007 | Hansen | H04M 3/54 455/417 |
| 2008/0090595 | A1* | 4/2008 | Liu et al. | 455/461 |
| 2009/0291706 | A1* | 11/2009 | Lee | H04W 48/18 455/550.1 |
| 2011/0177818 | A1* | 7/2011 | Heit | H04M 3/58 455/436 |
| 2011/0292839 | A1* | 12/2011 | Swaminathan | H04L 65/1069 370/259 |
| 2012/0172021 | A1* | 7/2012 | Park | H04M 1/7253 455/417 |
| 2012/0254228 | A1* | 10/2012 | Patoskie | G06F 3/017 707/769 |
| 2012/0254463 | A1* | 10/2012 | Patoskie | G06F 1/1694 709/238 |
| 2013/0183950 | A1* | 7/2013 | Hwang | 455/417 |
| 2013/0219278 | A1* | 8/2013 | Rosenberg | G06F 3/01 715/733 |
| 2013/0219288 | A1* | 8/2013 | Rosenberg | H04M 3/54 715/748 |
| 2013/0331067 | A1* | 12/2013 | Coussemaeker | G06Q 10/10 455/412.2 |
| 2014/0065997 | A1* | 3/2014 | Walker et al. | 455/404.1 |
| 2014/0171048 | A1* | 6/2014 | Sanaullah | H04W 4/16 455/416 |
| 2014/0273834 | A1* | 9/2014 | Merckling | 455/41.1 |
| 2015/0181398 | A1* | 6/2015 | Garbin | H04W 4/16 455/417 |
| 2016/0278143 | A1* | 9/2016 | Akhtar Masoom Akhtar | H04W 84/12 |

* cited by examiner

METHOD AND SYSTEM FOR CALL-FORWARD INITIATED BY MOVEMENT

CROSS-REFERENCE TO RELATED APPLICATIONS/INCORPORATION BY REFERENCE

This application makes reference to and claims priority to European Patent Application Serial No. 13166961.6 filed on May 8, 2013. The above identified application is hereby incorporated herein by reference in its entirety.

FIELD

Certain embodiments of the invention relate to communication. More specifically, certain embodiments of the invention relate to a method and system for call-forward initiated by movement.

BACKGROUND

Although cellular communication has become prevalent, wired communication is still an important part of communications today, including conventional phone systems as well as IP-based communications. Integrating various communications protocols is difficult and expensive.

Further limitations and disadvantages of conventional and traditional approaches will become apparent to one of skill in the art, through comparison of such systems with the present invention as set forth in the remainder of the present application with reference to the drawings.

BRIEF SUMMARY

A system and/or method for call-forward initiated by movement substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION

Certain aspects of the disclosure may be found in call-forward initiated by movement. Exemplary aspects of the invention may comprise receiving a call in a first communication device, sensing a motion of the first communication device, and forwarding the received call to a second communication device based on the sensed motion of the first communication device. The second communication device may be selected from one or more detected communication devices based on the sensed motion. The second communication device may be selected based on a direction of the sensed motion of the first communication device. The call may be established over a first communication network between a server and the first communication device, and the call may be forwarded to the second communication device by switching the call in the server to the second communication device over a second communication network. The call may be forwarded to the second communication device over the local connection.

As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the term "e.g.," introduces a list of one or more non-limiting examples, instances, or illustrations.

Figure 1:
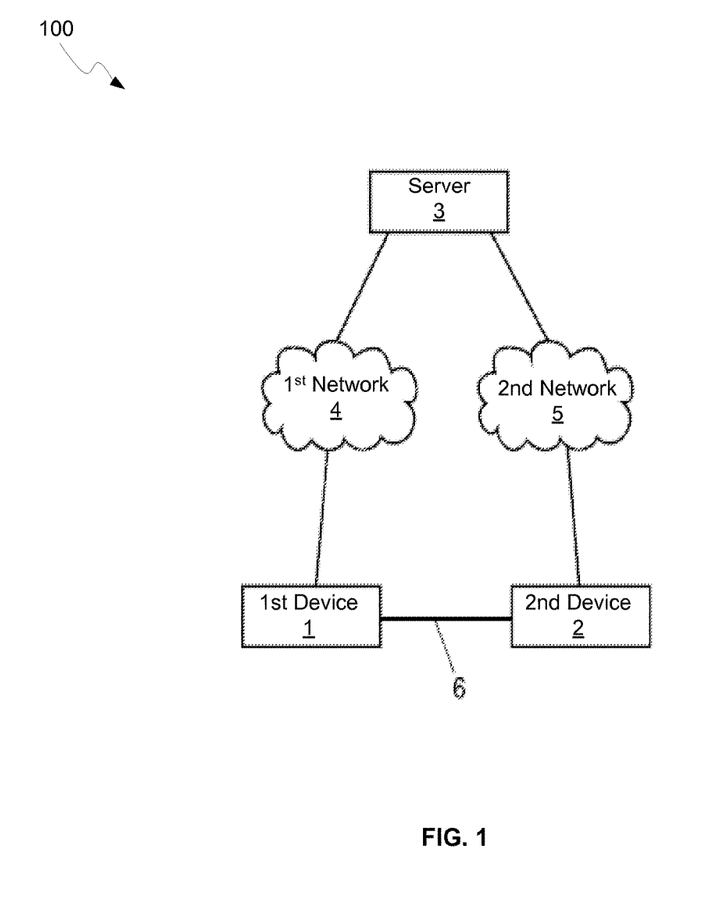
FIG. 1 is a diagram illustrating a system for a call-forward, in accordance with an example embodiment of the disclosure.

FIG. 1 is a diagram illustrating a system for a call-forward, in accordance with an example embodiment of the disclosure. Referring to FIG. 1, there is shown an a first communication device 1, at least one second communication device 2 and a server 3. The first communication device 1 may be connected with the server 3 over a first communication network 4. The second communication device 2 may be connected with the server 3 over a second communication network 5. The first communication device 1 may be connected with the at least one second communication device 2 over a local connection 6.

When a user is at home, sometimes a call is received at a first communication device, even if is the user prefers to handle the call over a second communication device. For example a call may be received at a cell phone, but the user of the cell phone prefers to talk over a wired-based phone, because the transmission quality is better. In another scenario, when a video call is received at a phone without display or video capabilities or where the transmission capabilities of the phone are low, it may be desired to transfer the call to a special video phone or other communication device with a display and with Internet access. Conventional devices only transfer a conventional call by manually selecting with keys or touch screen of the first communication device the function call-forward and entering or selecting the phone number of the second communication device. Since the small displays of mobile phones and even of smart phones provide several other functions, it often requires a complex interaction with the keys or touch screen of the conventional communication device to select the function of a call-forward.

The first communication device 1 may be configured to establish calls over the first communication network, to identify the second communication device 2, and to transfer a call to identified second communication device 2. Establishing a call includes receiving a call and initiating a call. In one embodiment, the first communication device 1 may comprise a mobile cellular device which is identifiable on the basis of a subscriber identity module (SIM) entered in the mobile cellular device, e.g., a mobile phone, a mobile smart phone, a tablet, a mobile computer.

The mobile cellular device may be identifiable via information stored on the SIM like the international mobile subscriber number (IMSI) or via the phone number corresponding to the SIM. Therefore, a call may be switched by a mobile cellular telephone network like Global System for Mobil Communications (GSM), Universal Mobile Telecommunications System (UMTS), Long Term Evolution (LTE) or other mobile phone standards defined by European Telecommunications Standards Institute (ETSI) as examples of the first communication network 4 to the mobile cellular device. However, the call may also be transferred via the Internet or via the Internet and a cellular phone network as first communication network 4 to the mobile cellular device using internet protocol (IP) telephony.

In one embodiment, the first communication device 1 may be portable and communicates with the server 3 over the air. This includes also mobile telephones communicating wirelessly, e.g., using the digital enhanced cordless telecommunications (DECT), with a base station which is connected via a landline to the landline telephone network or public switched telephone network (PSTN). As already mentioned, in one embodiment, the first communication device 1 may comprise a landline-based telephone configured to establish, via the server 3, a call over the PSTN as an example of the first communication network 4. In one embodiment, the first communication device 1 may be configured to communicate to the internet as an example of the first communication network 4 and to establish calls by IP telephony via the server 3.

The second communication device 2 may be configured to receive a call forwarded from the first communication device 1. In one embodiment, the call may be forwarded to the second communication device 2 over the local connection 6. In this embodiment, the second communication network 5 may be superfluous. In another embodiment, the forwarded call may be received from the server 3 over the second communication network 5, where the server 3 has switched the call to the second communication device 2 such that the call does not pass the first communication device 1 anymore. In this embodiment, the local connection 6 between the first communication device 1 and the second communication device 2 is not necessarily needed.

In one embodiment, the first and the second communication network 4 and 5 may comprise the same network and in another embodiment, they are different networks. In one embodiment, the second communication network 5 is one or more of PSTN, mobile cellular phone network, and the Internet and the second communication device 2 may be configured to receive forwarded calls over the respective protocol/transmission-coding of the second communication network 5. In a preferred embodiment, the first communication device 1 and the second communication device 2 may be connected over a local connection 6. This local connection 6 is preferably wireless, but may also be wired. In one embodiment, the local connection 6 may comprise a direct connection between the first communication device 1 and the second communication device 2 without a further transmission device in between.

In one embodiment, the local connection 6 may comprise an indirect connection between the first communication device 1 and the second communication device 2 comprising a further transmission device like a router or hub in between. Examples for local connections 6 are Bluetooth, Wireless Local Area Network (WLAN), infrared, a transponder connection like RFID, DECT or Near Field Communication (NFC). The local connection 6 may also be established by power line communication (PLC), i.e., over a conductor that is simultaneously used for alternating current (AC) electric power transmission. Instead of communicating via the first communication device 1 and/or the second communication device 2, their charging stations could communicate over the power line.

The call-forward system shown has the advantage that the user does not have to navigate through complex user interfaces of the first communication device to select the call-forwarding function and to select the second communication device. The user may simply move the first communication device in the direction of the second communication device and the call forward is initiated to the desired second communication device.

In an example scenario, a movement of the first communication device may be measured, the measured movement may be compared with predetermined movement characteristics, and based on the comparison result, the call may be forwarded to the second communication device. This has the advantage that the call forward may be initiated by detecting a movement with predetermined movement characteristics. Therefore, not only the second communication device is identified by the movement, but also the desire of the user to forward a call may be expressed by a certain movement.

The predetermined movement may correspond to a movement of a hand performing a throwing motion. This movement is on the one hand well-adapted to express a direction and on the other hand not so usual that a call is forwarded without the desire of the user. The direction may be determined on the basis of the trajectory of the motion.

In another example scenario, the second communication device may be identified among at least one communication device detected via at least one local connection. This has the advantage that the local connection to at least one communication device may restrict the communication devices to a certain number among which the second communication device may be identified. The call may be forwarded to the second communication device over the local connection.

In an example scenario, the call may be established over a first communication network between a server and the first communication device, and the call may be forwarded by the server to the second communication device by switching the established call from the first communication device and the first communication network to the second communication device over a second communication network. This has the advantage that the transmission and device characteristics of the forwarded call at the second communication device do not depend on the transmission and device characteristics of the call established over the first communication network at the first communication device.

In another example scenario, identifying the second communication device may comprise determining an identifier of the second communication device in the second communication network, and forwarding the call comprises switching the call in the server from the first communication device to the second communication device on the basis of the determined identifier. The identifier may comprise at least one of a phone number, an Internet Protocol (IP) address, and/or subscriber identity module (SIM) information.

The second communication device may be identified on the basis of the determined direction, a reference direction, the position of the first communication device and the position of the second communication device, etc. The position of the first communication device and/or of the second communication device may be determined on the basis of at least one of a local network providing a local connection between the first communication device and the second communication device, a cellular phone network and a satellite based global positioning system.

In an example scenario, the reference direction may be determined on the basis of one or both of a magnetic field of the earth and a local connection between the first communication device and the second communication device. The first communication device may be connected to a cellular phone network as a first communication network and the second communication device may be connected to one or more of a mobile phone network, internet and wire-based public switched telephone network as a second communication network.

Figure 2:
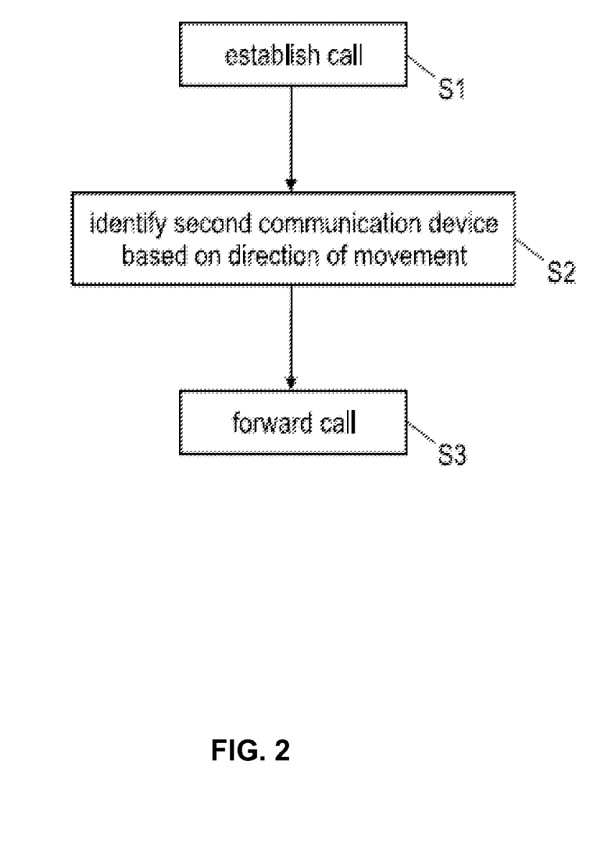
FIG. 2 illustrates example steps in forwarding a call between devices, in accordance with an example embodiment of the disclosure.

FIG. 2 illustrates example steps in forwarding a call between devices, in accordance with an example embodiment of the disclosure. Referring to FIG. 2, there are shown example steps S1-S3. In step S1, a call is established at the first communication device 1. This includes receiving or initiating a call at the first communication device 1. In step S2, a second communication device 2 may be identified on the basis of a movement of the first communication device 1 as described in more detail in relation to FIG. 3. In step S4, a call may be forwarded to the second communication device 2 identified in the third step S2.

In one embodiment of step S4, the call established at the first communication device 1 may be forwarded over the local connection 6 to the second communication device 2. In this case, the second communication device 2 does not necessarily need a connection to the second communication network 5 to receive the forwarded call. This could be advantageous, when only another kind of communication device 2 is preferred for talking without the necessity to change the communication network.

In one example, when a bigger display is needed for a video call, the call may be forwarded to a television which includes also a microphone by the local connection 6. Alternatively, only the image part of the call may be forwarded to the television and the voice may be kept at the first communication device 1. Therefore, the first communication device 1 may display a list of possible forwarding possibilities, wherefrom the user selects the desired one. Such forwarding possibilities could be: only voice communication, only video communication, or complete call. In another example, the user could prefer to establish, instead of at the mobile phone or tablet as first communication device 1, a phone call at a second communication device 2 like a landline phone which is more comfortable for talking.

In a preferred embodiment of step S4, the server 3 may forward the call to the second communication device 2 and switch the call from the first communication device 1 to the second communication device 2. Consequently, the call does not need to pass through the first communication network 4 and the first communication device 1, but may be switched to the second communication device 2 so that the call may be connected from at least one communication device on the other side of the call over the server 3 over the second communication network 5 to the second communication device 2. This may be especially advantageous if the call forward is initiated for changing the transmission characteristics of the call. For example, a video call received at a mobile cell phone as a first communication device 1 with a lower transmission capability would preferably be transferred as an IP video phone call to a computer, as second communication device 2, over the Internet, as second communication network 5, which may have a larger bandwidth as the mobile cellular phone network as first communication network 4.

Figure 3:
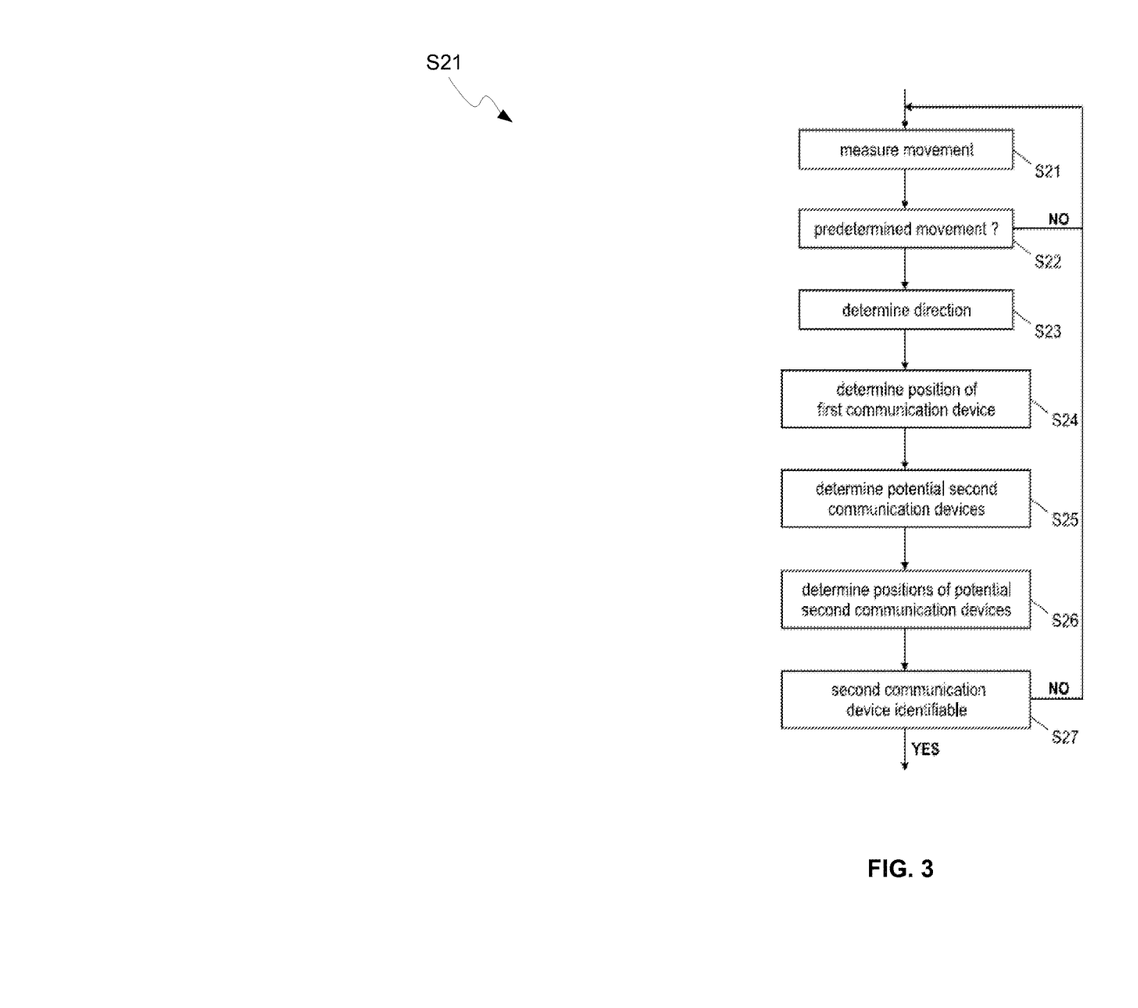
FIG. 3 illustrates example steps in identifying a second communication device in a call-forward process, in accordance with an example embodiment of the disclosure.

FIG. 3 illustrates example steps in identifying a second communication device in a call-forward process, in accordance with an example embodiment of the disclosure. Referring to FIG. 3, there is shown example steps S21-S27, which comprise more detailed steps within step S2 of FIG. 2. In step S21, the movement of the first communication device 1 may be measured. The movement may be represented by a time series of position, velocity, and/or acceleration vectors of the first communication device 1. In one embodiment, the movement may be measured by an acceleration sensor in the first communication device 1.

The series of acceleration values over time may be used to determine a trajectory and/or a velocity profile of the first communication device 1. In another embodiment, a sensor in the first communication device 1 may determine the position of the first communication device 1 over time in order to determine the trajectory and/or velocity profile. For example, satellite based position systems such as Global Positioning System (GPS) may be used if the position determination is accurate enough. Also other sensors may be used that work on locally installed position determining systems. In one embodiment, the position of the first communication device 1 over time may be determined outside of the first communication device 1, e.g. by the first communication network 4 (e.g., mobile cellular phone network) or by a local network providing the local connection 6 (e.g., by a WLAN-router).

In step S22, the measured movement of the first communication device 1 may be compared with predetermined movement characteristics. In a preferred embodiment, characteristics of a movement of the first communication device 1 performing the movement of a hand throwing an object (throwing motion) may be used as predetermined movement characteristics. For example, the absolute velocity or acceleration over time may be used to detect typical throw speed/acceleration profiles. However, alternatively, or additionally, it may be determined that the trajectory of the first communication device 1 fulfills the characteristics of a trajectory of a throwing motion.

Examples of characteristics of a throwing motion may comprise: the trajectory may be within one plane in three-dimensional space, the trajectory may comprise a particular curvature (maybe only one curvature), the trajectory may locally and timely not be longer than a certain value, etc. . . . In order to detect such predetermined movement characteristics in the measured movement, statistical methods may be used. If such a predetermined movement characteristic is detected in the movement of the first communication device 1, the example steps may continue with step S23, otherwise the method goes back to S21 and continues to measure the movement and to compare the measured movement with the predetermined movement characteristics. The step S22 may preferably be performed in the same device which measures the movement of the first communication device 1.

In step S23, the movement of the first communication device 1 corresponding to the predetermined movement characteristics, i.e., the corresponding time period of the measured movement, may be used to determine a direction of the movement. The direction of the movement may be computed by determining an average velocity direction of the movement. If the movement is measured in step S21 on the basis of velocity or acceleration measurements in the first communication device 1, at least one reference direction may be required for calibrating the coordinate system of the first communication device 1 and to determine the direction of the movement. In one embodiment, the magnetic field of the earth may be used as reference direction. In another embodiment, the reference direction may be determined by determining the angle from which connection signals of the local connection 6 are received, e.g., by several antennas. Additionally, the direction of gravity may be used as reference direction. In one embodiment, a combination of the mentioned reference directions may be used.

Once the direction of the movement is determined in S23, in step S24 the position of the first communication device 1 may be determined. The position may be obtained by a satellite based position system like GPS by a corresponding sensor in the first communication device 1; by the first communication network 4, e.g., by triangulation of different base stations of the network 4; by the local network of the local connection 6, e.g., by triangulation of several WLAN router; and/or by a separate locally arranged system for determining the position, or a combination of those.

The position of the first communication device 1 may also be determined on the basis of a predetermined position of the first communication device 1 or a part of the first communication device 1. For example, if the first communication device 1 is fixed at a certain position, the position may be manually entered in the first communication device 1, when installing the phone. If the first communication device 1 is portable, but has a charging station at a fixed position, the position could be stored and used always when the first communication device 1 is connected with the charging station.

In step S25, potential second communication devices 2 for forwarding the call are identified. In one embodiment, the second communication devices 2 in the vicinity of the first communication device 1 may be detected as potential second communication devices 2. In one embodiment, the second communication devices 2 in the vicinity suitable for receiving the forwarded call may be detected as a second communication device 2. In one embodiment, the potential second communication devices 2 in the vicinity may be detected on the basis of the local connections 6 between the first communication device 1 and the second communication devices 2. This detection may be performed in a device of the local network, e.g., a WLAN router, or in the first communication device 1.

In one embodiment, after potential second communication devices 2 have been detected in the vicinity, the list may be restricted to the ones that are suitable for receiving the forwarded call with the characteristics of the call. However, this test may also be performed later after the second communication device 2 has been identified. In addition, the second communication devices 2 might be related to authorized identities which could be compared to an identity of the first communication device 1, in order to select the second communication devices 2 being authorized for the identity of the first communication device 1. The identity might be a hardware identity like the SIM card but may also be a software identity like login information. In step S26, the positions of the potential second communication devices 2 may be determined. The position may be determined, for example, as described with the first communication device 1.

In step S27, if at least one second communication device 2 has been identified, the positions and direction of the potential second communication devices 2 may be determined based on the relative position and direction of the first communication device. If none of the potential second communication devices 2 has been identified, the method may loop back to S21. Otherwise in step S3, the call at the first communication device 1 may be forwarded to the second communication device 2 identified in S27. If more than one second communication devices 2 are identified by the direction determination, automatic rules may be applied to select one (e.g., the closest one or the smallest angle derivation from the determined direction) or the first communication device 1 may request a user input for selecting one of the identified second communication devices 2.

Figure 4:
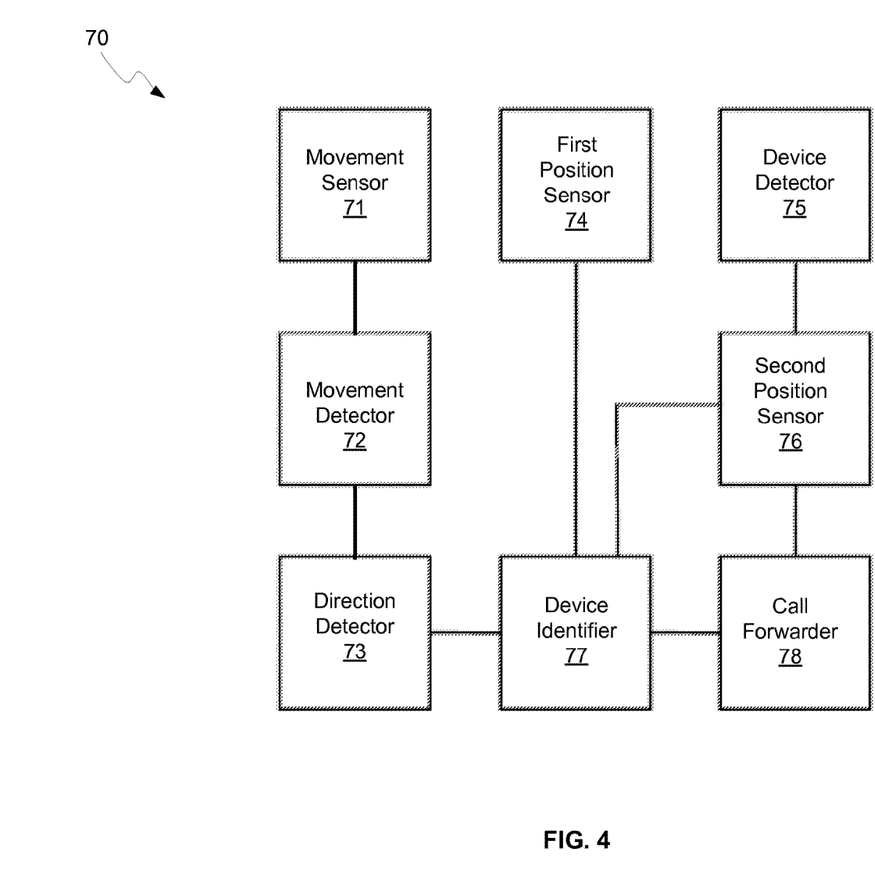
FIG. 4 illustrates an example system for forwarding a call, in accordance with an example embodiment of the disclosure.

FIG. 4 illustrates an example system for forwarding a call, in accordance with an example embodiment of the disclosure. Referring to FIG. 4, the system 70 may comprise a movement sensor 71, a movement detector 72, a direction detector 73, a first position sensor 74, a communication device detector 75, a second position sensor 76, a communication device identifier 77, and a call forwarder 78.

The movement sensor 71 may be configured to measure the movement of the first communication device 1 for example as described with respect to step S21. The movement sensor 71 may be connected with the movement detector 72, which may be configured to detect a predetermined movement characteristic in the movement received from the movement sensor 71 for example as described with respect to step S22. The movement detector 72 may be connected with the direction detector 73, which detects a direction on the basis of the detected movement received from the movement detector 72 for example as described with respect to step S23. The detected direction may be transmitted to the communication device identifier 77.

The first position sensor 74 may be configured to determine the position of the first communication device 1, for example as described with respect to step S24, and to transmit the determined position to the communication device identifier 77. If the first communication device 1 is fixed at a certain position, the position of the first communication device 1 may be manually entered in the first position sensor 74. The communication device detector 75 may be configured to detect potential second communication devices 2 in the vicinity of the first communication device 1, for example as described with respect to step S25, and to forward the at least one potential second communication device 2 detected to the second position sensor 76.

The second position sensor 76 may be configured to determine the position of all potential second communication devices 2 received from the communication device detector 75, for example as described with respect to step S26, and to forward the positions of the potential second communication devices 2 to the communication device identifier 77. The communication device identifier 77 may be configured to identify an amount of second communication devices 2 on the basis of the received position of the first communication device 1, the positions of the potential second communication devices 2 and the direction of the movement for example as described with respect to step S27.

The amount of second communication devices 2 may comprise zero, one, or more second communication devices 2. In the case of zero second communication devices 2, no second communication device 2 has been identified to forward the call and the call is not forwarded. In the case of one second communication device 2, the information about the one second communication device 2 may be sent to the call forwarder 78. In the case of two or more second communication devices 2, further information like user input or further position information may be used to restrict the identified second communication devices 2 to one identified second communication device 2, which may then be forwarded to the call forwarder 78. The call forwarder 78 may be configured to initiate the call forward from the first communication device 1 to the identified second communication device 2, for example as described with respect to step S3.

Figure 5:
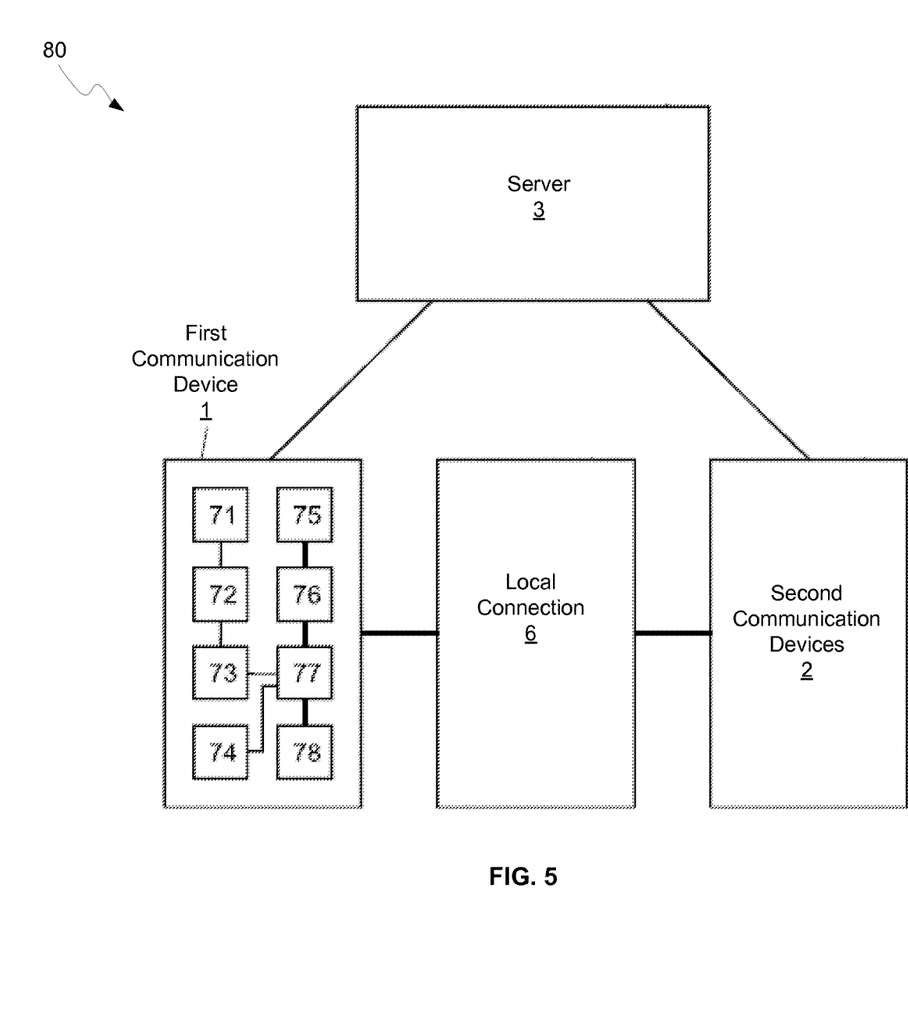
FIG. 5 illustrates another example system for call-forwarding, in accordance with an example embodiment of the disclosure.

FIG. 5 illustrates another example system for call-forwarding, in accordance with an example embodiment of the disclosure. Referring to FIG. 5, there is shown the system for forwarding a call comprising the first communication device 1, the second communication device 2, the server 3 and the local connection 6. In this embodiment, the movement sensor 71, the movement detector 72, the direction detector 73, the first position sensor 74, the communication device detector 75, the second position sensor 76, the communication device identifier 77, and the call forwarder 78 may be arranged in the first communication device 1.

The movement of the first communication device 1 may be sensed by the movement sensor 71 utilizing an acceleration sensor or by other position sensors. The list of potential second communication devices 2 may be determined on the basis of the communication devices detected or connected to the local connection 6 in the communication device detector 75. The position of the potential second communication devices 2 may be received from the local network 6 or the second communication devices 2 in the second position sensor 76. For fixed second communication devices 2, the position of the second communication devices 2 may be stored directly in the second position sensor 76, or alternatively, stored in each second communication device 2, which communicates its position over the local connection 6, e.g., by PLC.

The call forwarder 78 may be configured to directly forward the call over the local connection 6 or by directly forwarding the call over the first and second communication networks 4 and 5 using the identification information of the second communication device 2 in the second communication network 5. This information may be received over the local network 6 in the call forwarder 78. Alternatively, the call forwarder 78 may be configured to send a message to the server 3 to switch the call from the first communication device 1 to the second communication device 2.

Figure 6:
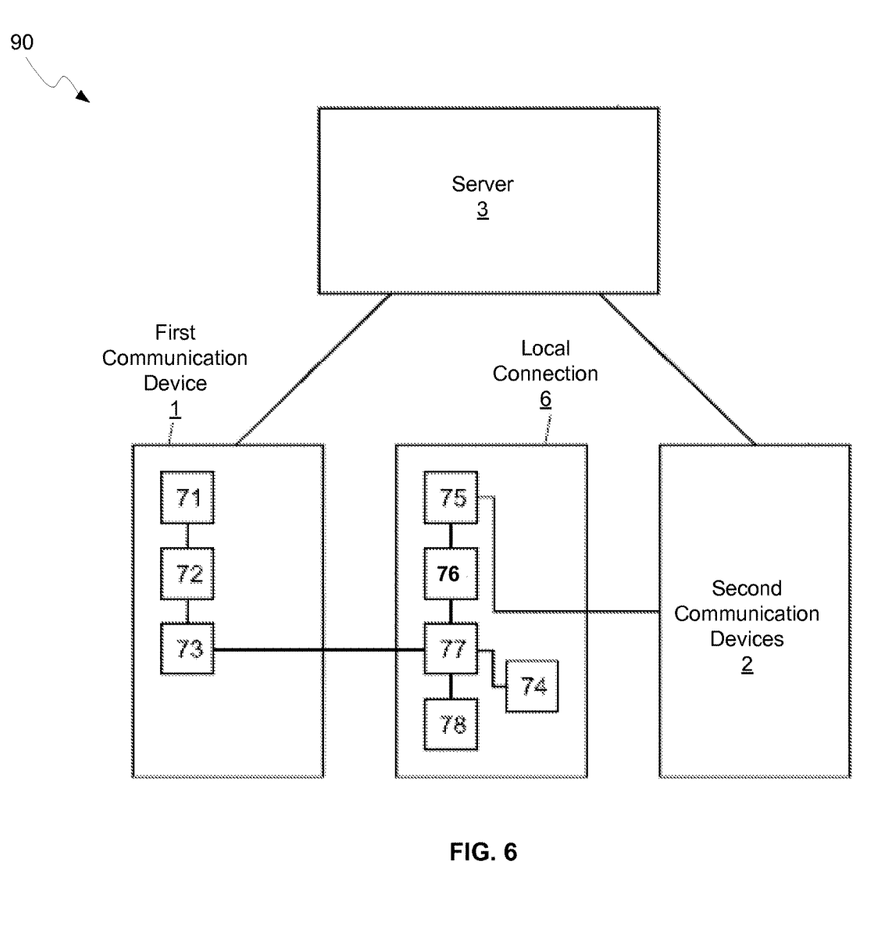
FIG. 6 shows an alternative embodiment of a system for call-forwarding, in accordance with an example embodiment of the disclosure.

FIG. 6 shows an alternative embodiment of a system for call-forwarding, in accordance with an example embodiment of the disclosure. Referring to FIG. 6, there is shown a call-forwarding system 90 comprising the first communication device 1, the second communication device 2, the server 3, and the local connection 6. In this embodiment, the movement sensor 71, the movement detector 72 and the direction detector 73, may be arranged in the first communication device 1. The first position sensor 74, the communication device detector 75, the second position sensor 76, the communication device identifier 77, and the call forwarder 78 may be arranged in the network of the local connection 6, e.g., in a router of the local network like a WLAN router.

The movement of the first communication device 1 may be sensed by the movement sensor 71 utilizing an acceleration sensor or by other position sensors. The direction determined from the movement in the direction detector 73 may be sent to the communication device identifier 77 in the local connection 6. The list of potential second communication devices 2 may be determined on the basis of the communication devices detected or connected by the local connection 6 in the communication device detector 75. The position of the potential second communication devices 2 may be determined by the local network 6 or received from the second communication devices 2 in the second position sensor 76.

In one embodiment, the call forwarder 78 may be configured to send a message to the server 3 to switch the call from the first communication device 1 to the second communication device 2. In one embodiment, the call forwarder 78 may be configured to send a message to the first communication device 1 to forward the call from the first communication device 1 to the second communication device 2. In an alternative embodiment, the movement sensor 71, the movement detector 72, and the direction detector 73 may also be arranged in the local connection 6 such that the movement of the first communication device 1 may be determined directly by the local network of the local connection 6.

Figure 7:
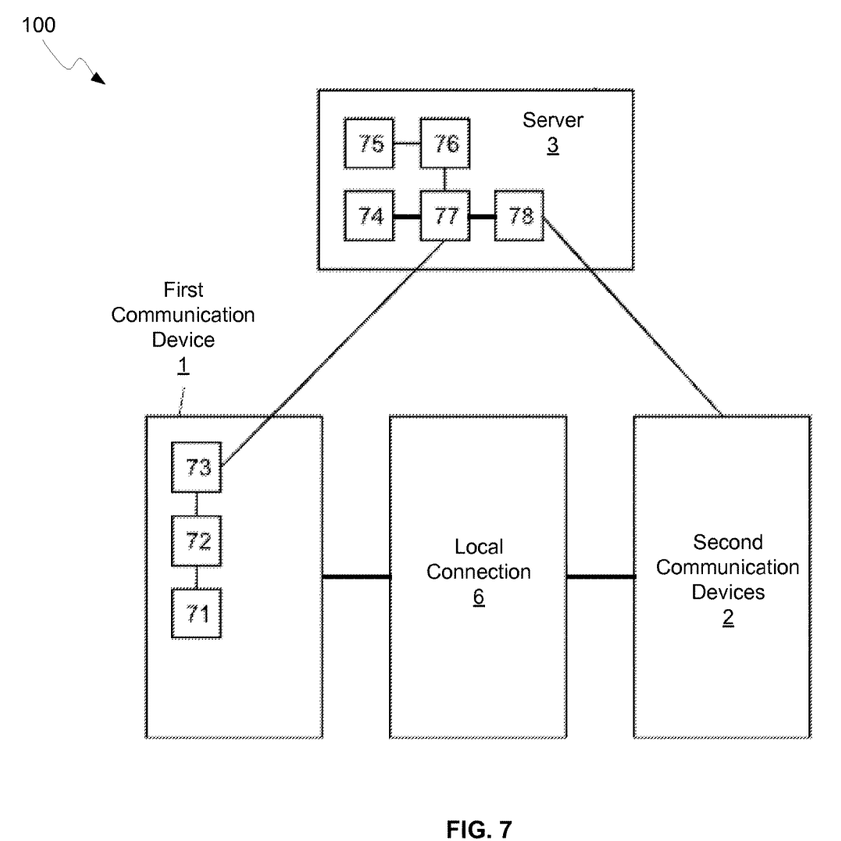
FIG. 7 shows another alternative embodiment of a system for call-forwarding, in accordance with an example embodiment of the disclosure.

FIG. 7 shows another alternative embodiment of a system for call-forwarding, in accordance with an example embodiment of the disclosure. Referring to FIG. 7, there is shown a call-forward system 100 comprising the first communication device 1, the second communication device 2, the server 3, and the local connection 6. In this embodiment, the movement sensor 71, the movement detector 72, and the direction detector 73 may be arranged in the first communication device 1. The first position sensor 74, the communication device detector 75, the second position sensor 76, the communication device identifier 77, and the call forwarder 78 may be arranged in the server 3, e.g., in a server 3 of the cellular phone network or of the Internet.

The movement of the first communication device 1 may be sensed by the movement sensor 71 utilizing an acceleration sensor or by other position sensors. The direction determined by the movement in the direction detector 73 may be sent to the communication device identifier 77 in the local connection 6. The list of potential second communication devices 2 may be determined on the basis of the communication devices detected or connected by the local connection 6 which informs the communication device detector 75 in the server 3 over the first or second communication network 4 or 5 or a third communication network. In this case, the position of the potential second communication devices 2 may be received from the local network 6 or the second communication devices 2 in the second position sensor 76.

Alternatively, the list of potential second communication devices 2 may be determined on the basis of the communication devices registered in the second communication network 5 in the vicinity of the first communication device 1. The second communication devices 2 may use different second communication networks 5 and the communication detector 75 may retrieve the positions of the second communication devices 2 in the vicinity of the first communication device 1 from the different second communication networks 5. In this case, the position of the second communication devices 2 may be forwarded to the second position sensor 76. The call forwarder 78 may be configured to switch the call from the first communication device 1 to the second communication device 2.

Figure 8:
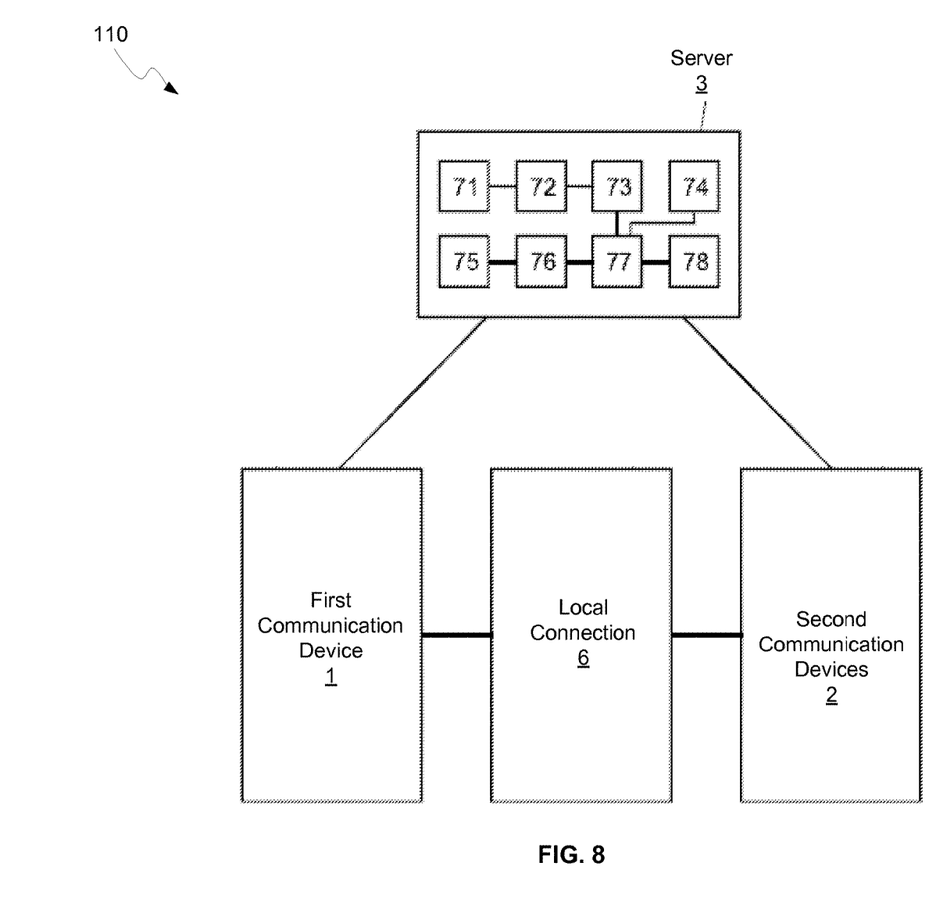
FIG. 8 shows another alternative embodiment of a system for call-forwarding, in accordance with an example embodiment of the disclosure.

FIG. 8 shows another alternative embodiment of a system for call-forwarding, in accordance with an example embodiment of the disclosure. Referring to FIG. 8, there is shown a call-forwarding system 110 comprising the first communication device 1, the second communication device 2, the server 3, and the local connection 6. In this embodiment, the movement sensor 71, the movement detector 72, the direction detector 73, the first position sensor 74, the communication device detector 75, the second position sensor 76, the communication device identifier 77, and the call forwarder 78 may be arranged in the server 3, e.g., in a server 3 of the cellular phone network or of the Internet. The movement of the first communication device 1 may be determined through the first communication network 4, e.g., by triangulation between different contacted cells.

In an embodiment of the disclosure, a method and system may comprise receiving a call in a first communication device, sensing a motion of the first communication device, and forwarding the received call to a second communication device based on the sensed motion of the first communication device. The second communication device may be selected from one or more detected communication devices based on the sensed motion. The second communication device may be selected based on a direction of the sensed motion of the first communication device. The call may be established over a first communication network between a server and the first communication device, and the call may be forwarded to the second communication device by switching the call in the server to the second communication device over a second communication network. The call may be forwarded to the second communication device over the local connection.

Other embodiments may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for call-forward initiated by movement.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A system for communication, the system comprising:
a first communication device, a transmission device comprising a device detector, a device identifier, a movement sensor, and a direction detector, the transmission device providing a local connection to the first communication device, a server, and one or more a-second communication devices, wherein the first transmission device is operable to cause forwarding of a received call to one of the one or more the second communication devices based on a sensed motion of the first communication device and wherein:
the device detector in the transmission device detects potential second communication devices that can receive forwarded calls;
the movement sensor in the transmission device senses a motion of the first communication device;
the direction detector in the transmission device determines a direction of the motion and communicates the determined direction to the device identifier; and
the device identifier determines which of the one or more second communication devices to forward the call to based on the received determined direction.

2. The system according to claim 1, wherein the first communication device is operable to select one of the one or more second communication devices based on the sensed motion.

3. The system according to claim 1, wherein the sensed motion of the first communication device comprises a throwing motion characteristic.

4. The system according to claim 3, wherein the throwing motion characteristic comprises a throw acceleration profile.

5. The system according to claim 1, wherein the device detector generates a list of potential second communication devices.

6. The system according to claim 1, wherein the transmission device providing the local connection comprises a wireless router.

7. The system according to claim 1, wherein the call is established over a first communication network between the server and the first communication device, and is forwarded to one of the one or more second communication devices by switching the call in the server to the one of the one or more second communication devices over a second communication network.

8. The system according to claim 1, wherein the call is forwarded to one of the one or more second communication devices over the local connection.

9. A system for communication, the system comprising:
a first communication device comprising a movement sensor and a direction detector, a transmission device comprising a device detector and a device identifier, the transmission device providing a local connection to the first communication device, a server, and a second communication device, wherein:
the transmission device is operable to cause forwarding of a received call to the second communication device based on a sensed motion of the first communication device;
the device detector in the first communication device detects potential second communication devices that can receive forwarded calls;
the movement sensor in the first communication device senses a motion of the first communication device;
the direction detector in the first communication device determines a direction of the motion and communicates the determined direction to the device identifier in the transmission device; and
the device identifier determines which of the one or more second communication devices to forward the call to based on the received determined direction.

10. The system according to claim 9, wherein the first communication device is operable to select one of the one or more second communication devices based on the sensed motion.

11. The system according to claim 9 wherein the sensed motion of the first communication device comprises a throwing motion characteristic.

12. The system according to claim 11, wherein the throwing motion characteristic comprises a throw acceleration profile.

13. The system according to claim 9, wherein the device detector generates a list of potential second communication devices.

14. The system according to claim 9, wherein the call is established over a first communication network between the server and the first communication device, and is forwarded to one of the one or more second communication devices by switching the call in the server to the one of the one or more second communication devices over a second communication network.

15. The system according to claim 9, wherein the call is forwarded to one of the one or more second communication devices over the local connection.

16. A method for communication, the method comprising:
receiving a call in a first communication device;
detecting potential second communication devices that can receive forwarded calls, said detecting using a device detector in the transmission device;
sensing a motion of the first communication device utilizing a movement sensor in a transmission device providing a local connection to the first communication device;
determining a direction of the sensed motion using a direction detector in the transmission device;
communicating the determined direction to a device identifier in the transmission device;
and
determining which of the one or more second communication devices to forward the call to based on the received determined direction.

17. The method according to claim 16, comprising selecting, using the first communication device, one of the one or more second communication devices based on the sensed motion.

18. The method according to claim 16, wherein the sensed motion of the first communication device comprises a throwing motion characteristic.

19. The method according to claim 16, comprising establishing the call over a first communication network between a server and the first communication device, and forwarding the call to one of the one or more second communication devices by switching the call in the server to the second communication device over a second communication network.

20. The method according to claim 19, comprising forwarding the call to one of the one or more second communication devices over the local connection.

* * * * *